United States Patent [19]

Madonna et al.

[11] Patent Number: 5,598,409
[45] Date of Patent: Jan. 28, 1997

[54] PROGRAMMABLE TELECOMMUNICATIONS SWITCH FOR PERSONAL COMPUTER

[75] Inventors: Robert P. Madonna, W. Barnstable; Robert J. Buttell, Pocasset; Mark P. Hebert, Kingston, all of Mass.

[73] Assignee: Excel, Inc., Hyannis, Mass.

[21] Appl. No.: 651,123

[22] Filed: May 21, 1996

Related U.S. Application Data

[63] Continuation of Ser. No. 350,589, Dec. 6, 1994, abandoned, which is a continuation of Ser. No. 216,692, Mar. 23, 1994, abandoned, which is a continuation of Ser. No. 953,690, Sep. 29, 1992, Pat. No. 5,321,744.

[51] Int. Cl.[6] .............................. H04M 3/00; H04M 3/22
[52] U.S. Cl. ........................ 370/364; 379/269; 379/284; 370/376
[58] Field of Search .............................. 379/88, 201, 268, 379/269, 279, 218, 225, 284; 370/58.3, 58.2

[56] References Cited

U.S. PATENT DOCUMENTS

| | | | |
|---|---|---|---|
| 4,009,337 | 2/1977 | Sakai et al. | 379/122 |
| 4,228,536 | 10/1980 | Gueldenpfennig et al. | 370/66 |
| 4,527,012 | 7/1985 | Caplan et al. | 379/284 |
| 4,736,406 | 4/1988 | Molnar | 379/94 |
| 4,736,409 | 4/1988 | Hasegawa et al. | 379/269 |
| 4,908,850 | 3/1990 | Masson et al. | 379/212 X |
| 4,916,726 | 4/1990 | Morley, Jr. et al. | 379/218 X |
| 4,955,054 | 9/1990 | Boyd, Jr. et al. | 379/269 |
| 4,993,017 | 2/1991 | Bachinger et al. | 370/58.2 |
| 5,007,080 | 4/1991 | MacMillan et al. | 379/269 |
| 5,014,269 | 5/1991 | Picandet | 370/85.11 |

FOREIGN PATENT DOCUMENTS

| | | |
|---|---|---|
| 0192894 | 9/1986 | European Pat. Off. |
| 0350402 | 1/1990 | European Pat. Off. |
| 3534918 | 4/1987 | Germany . |
| 0358597 | 3/1990 | Germany . |
| 4101885 | 7/1992 | Germany . |
| 58-69193 | 4/1983 | Japan . |

OTHER PUBLICATIONS

"Travels," Andy, Marc and Harry, Teleconnect vol. 5 Issue 11 pp. 39–40.

IEEE International Conference On Communications—ICC 1990—Paper 211.3 vol. 1, 15 Apr. 1990, Atlanta, (US) pp. 128–133 XP147390.

Brochure for Model PCX–384 PC Digital Switching Exchange, manufactured and sold by Excel, Inc., Sagamore Beach, MA. Undated.

User's Manual for Model PCX–384 PC Digital Switching Exchange Undated.

*Primary Examiner*—Thomas W. Brown
*Assistant Examiner*—Daniel S. Hunter
*Attorney, Agent, or Firm*—Cesari and McKenna

[57] ABSTRACT

A user-programmable telephone switch which resides within a commercially available personal computer. The switch is controllable by either the personal computer's microprocessor or a separate, external host connected to an interface provided within the switch. The switch includes a CPU/matrix card that contains a time slot interchange and a CPU running under a real time operating system. The CPU/matrix card controls the overall operation of the switch in accordance with messages received from the operative host. In general, those tasks or functions which must be performed in real time are the responsibility of the switch, as opposed to the internal or external host. Within the switch, certain tasks or functions may be delegated by the CPU/matrix card to intelligent line cards which contain their own microprocessors having substantial call processing capability.

28 Claims, 4 Drawing Sheets ing a real time operating system on the host. This is because
PROGRAMMABLE TELECOMMUNICATIONS SWITCH FOR PERSONAL COMPUTER This is a continuation of U.S. Ser. No. 08/350,589, filed Dec. 6, 1994 and now abandoned, which is a continuation of U.S. Ser. No. 08/216,692, filed Mar. 23, 1994, which is now abandoned, which is a continuation of U.S. Ser. No. 07/953,690, filed Sep. 29, 1992 and issued as U.S. Pat. No. 5,321,744 on Jun. 14, 1994.

BACKGROUND OF THE INVENTION

1. Field of the Invention

The present invention relates generally to the field of telecommunications and, more specifically, to a programmable telecommunication switch which may reside within a personal computer.

2. Discussion of the Prior Art

User-programmable telecommunication switches are used in a wide variety of applications such as voice messaging, telemarketing services and the like. A programmable switch is usually controlled by a host device, which is typically a computer that runs an application program. A customer may either purchase a commercially available application program that is compatible with the host and switch hardware or may elect to write a custom program.

As the application program runs, the host issues instructions to the switch by way of a communication channel. The switch responds to these instructions by taking appropriate action, which may include issuing a response to the host to confirm receipt or execution of the instructions.

Conventional programmable switches exhibit several disadvantages which unduly limit their utility in many applications. For example, a conventional switch that requires its host device to become involved with call processing tasks that must be performed in "real time" creates a significant processing burden on the host. The term "real time" is used herein to refer generally to call processing (e.g., sending or receiving digits) or other tasks which must be executed within a time period on the order of tens of milliseconds. If the host is running under an operating system, such as DOS® or UNIX®, which is user or application-oriented and not designed for real time operation, the real time demands made by the switch will tend to monopolize the host's processing resources. This may, in turn, force the customer to undesirably limit the amount of traffic through the switch so that the host can maintain control.

This problem is not satisfactorily solved by simply installing a real time operating system on the host. This is because the multitude of real time call processing tasks generated by a switch having a few hundred ports would still occupy so much of the host's resources that the application program could not run properly. Moreover, most commercially available computers which could be used as hosts do not operate on any widely used real time operating system. Prospective customers express a strong preference, if not an absolute demand, for a host operating system that is widely used and represents no significant barrier to developing custom applications software.

Another disadvantage of conventional programmable switches is that they can only be connected to one host at a time. This means that should the host malfunction or fail, the switch will not be controllable and service will be impaired or completely lost.

SUMMARY OF THE INVENTION

In brief summary, the present invention provides a user-programmable telephone switch which resides within a commercially available personal computer. The personal computer, which typically runs on a widely used, application-oriented operating system, provides a platform for customers that is both easy to program and readily integratable into existing communication networks.

The switch is controllable by the personal computer's central processing unit (PC CPU), a motherboard or plug-in PC CPU, any of which may act as an "internal" host. Alternatively, the switch is controllable by a separate, external host connected to an interface provided within the switch.

When an internal host is used, all real time call processing is handled by the switch independent of the internal host. None of the internal host's resources (microprocessor, memory, disk, etc.) is needed to execute time-critical, real time tasks. Thus, all of the internal host's resources are available for use by the application program.

When an external host is used, none of the internal host's resources is needed to control the switch or perform real time call processing tasks. The external host's resources are available for use by the application program and the internal host may be used for a completely different application or, alternatively, held in reserve as a back-up should the external host fail. Also, when an external host is used, all that is required to make the switch operable is a passive backplane for supplying electrical power.

Physically, the switch comprises a plurality of circuit boards or cards which are dimensioned to fit within the chassis of the personal computer. A CPU/matrix card contains a time slot interchange and a central call processor (microprocessor) running under a real time, multi-tasking operating system. The CPU/matrix card, which includes circuitry for selecting either the internal host or external host to control the switch, conducts all communication with the host. The CPU/matrix card performs or delegates to other intelligent cards within the switch the performance of all real time call processing tasks, thus freeing the host from involvement in any real time tasks.

Four busses provide communication paths between the CPU/matrix card and other cards within the switch: a timing/control bus; a line card status/control bus; a time division multiplex (TDM) bus for carrying pulse coded modulation (PCM) voice traffic and analog line signalling; and an HDLC or interprocessor bus. A fifth bus, the battery/ring voltage bus, is connected only to line cards which terminate analog lines or trunks. These five busses are used exclusively by the programmable switch and do not interfere with communications within the internal host, such as those between the PC CPU and disk controllers, video graphics cards, serial or parallel ports or LAN controllers.

Digital (T1) line cards are provided for terminating digital lines or trunks. Each digital line card includes its own microprocessor which, under instructions from the CPU/matrix card, may be used to perform certain real time call processing tasks on board the line card. Digital line cards communicate with the CPU/matrix card over the HDLC bus.

Analog line cards are provided for terminating analog lines or trunks. Each analog line card may be configured with different modules to terminate lines or trunks having different types of signalling protocols on the same card.

Other optional cards, such as a digital signal processor (DSP) card, may be incorporated into the switch to provide desired services or features.

In accordance with one aspect of the present invention, tasks are architecturally divided according to whether they require real time processing. Those tasks which must be performed in real time are the responsibility of the switch, as opposed to the internal or external host. Further, within the switch, certain tasks or functions may be delegated by the CPU/matrix card to, for example, digital line cards which contain their own microprocessors having substantial call processing capability. This process of delegation is carried out automatically and transparently to the host. Consequently, the host is relieved of dealing with real time tasks, which tend to reduce efficiency and processing speed, and the CPU/matrix card is relieved of dealing with tasks pertaining to digital ports that are within the capability of a digital line card's processor.

Another advantage of the present invention is the high speed of host-to-switch messaging between the personal computer motherboard and the switch which resides thereon. This high messaging speed is achieved by using the standard personal computer bus as the communication channel between the internal host and the CPU/matrix card.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

DETAILED DESCRIPTION OF AN ILLUSTRATIVE EMBODIMENT

Figure 1:
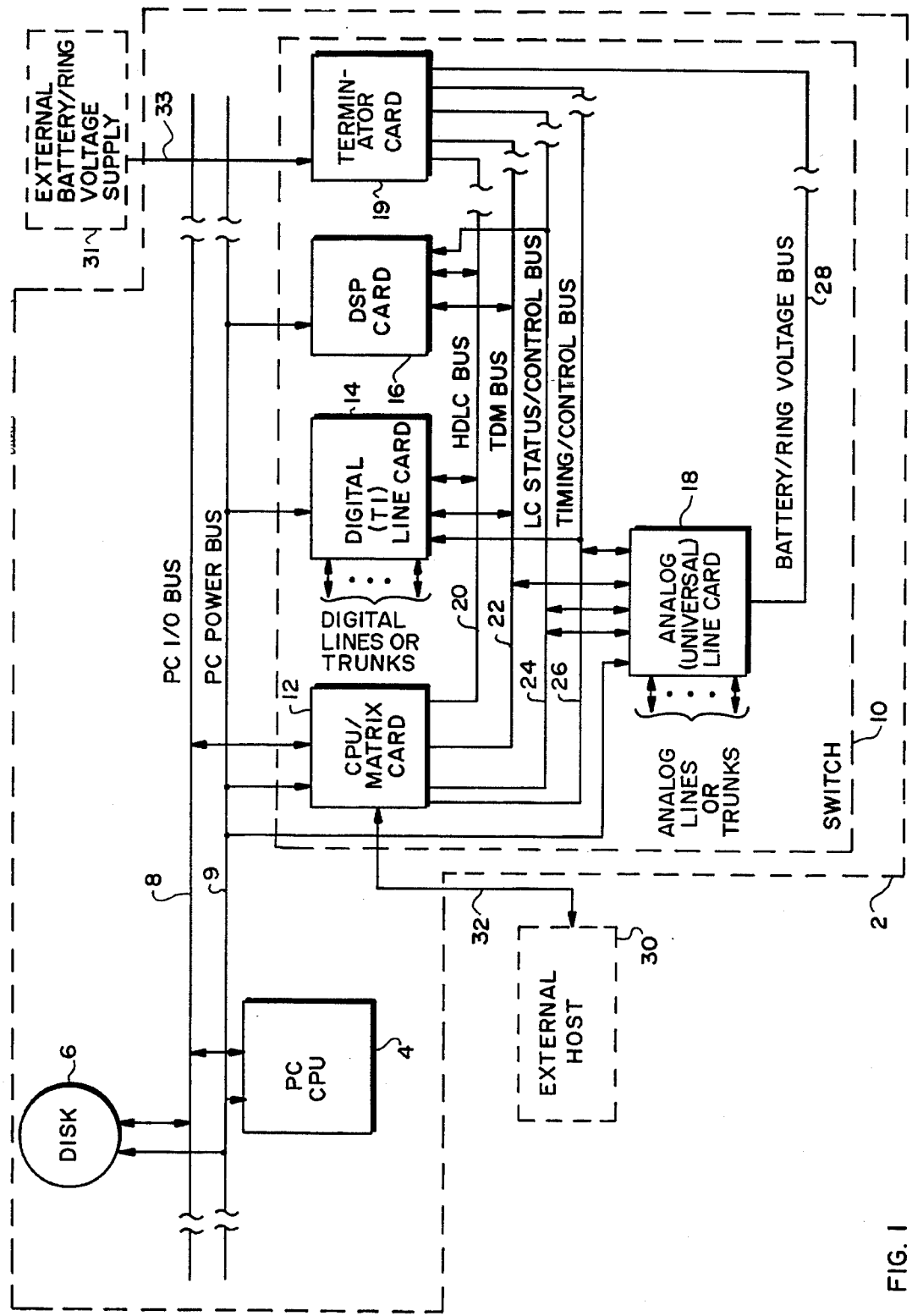
FIG. 1 is a block diagram of a programmable telecommunications switch which resides in a personal computer and which is constructed in accordance with a preferred embodiment of the present invention.

FIG. 1 shows a commercially available personal computer (PC) 2 which includes a PC central processing unit (CPU) 4 and a hard disk drive 6 interconnected by a PC input/output (I/O) bus 8 and a PC power bus 9. The PC 2 is preferably a PC-AT®, sold by International Business Machines, or a compatible thereof. Other personal computers having more memory or more powerful CPUs than the PC-AT® may also be used. The PC 2 preferably operates under an application-oriented operating system, such as DOS® or UNIX®.

The PC 2 consists of a chassis or housing in which a motherboard is mounted, along with the disk drive 6 and other optional assemblies such as floppy disk drives, modems and the like. The PC CPU 4 is mounted on the motherboard, which includes a series of "slots" into which other boards (cards) may be inserted and thereby connected to the PC I/O and power busses 8 and 9.

A programmable telecommunication switch 10 resides within the PC 2. A CPU/matrix card 12 is inserted into one of the slots on the motherboard and thus connected to the busses 8 and 9. The CPU/matrix card 12 is interconnected with a digital (T1) line card 14, a digital signal processing (DSP) card 16 and an analog (universal) line card 18 and a terminator card 19 by four busses: an HDLC or interprocessor bus 20; a TDM bus 22; a line card (LC) status/control bus 24; and a timing/control bus 26. A battery/ring voltage bus 28 supplies battery voltage (48 VDC) and ringing voltage (109 VAC) to the analog line card 18. The terminator card 19 serves to physically terminate busses 20, 22, 24, 26 and 28.

The line cards 14 and 18 and the DSP card 16 are all connected to and receive their basic operating power from the PC power bus 9. Although only one digital line card 14 and one analog line card 18 are depicted, it should be understood that additional line cards of either type may be added subject to two physical limitations: (1) the maximum switching capacity of the CPU/matrix card 12, and (2) the physical space within the chassis of the PC 2.

An external host 30, which may comprise a separate personal computer, workstation or other computer, may optionally be connected via a communication channel 32 to the CPU/matrix card 12. The CPU/matrix card 12 preferably includes a conventional RS-232 compatible interface for connecting the channel 32. The external host 30 preferably operates under an application-oriented operating system.

If desired, the switch 10 can reside on a passive backplane (no PC CPU 4 or disk 6 present) from which its receives electrical power and be controlled by the external host 30.

An external battery/ring voltage supply 31 is connected via a path 33 to the terminator card 19. Supply 31 may comprise, for example, a commercially available power supply.

Figure 2:
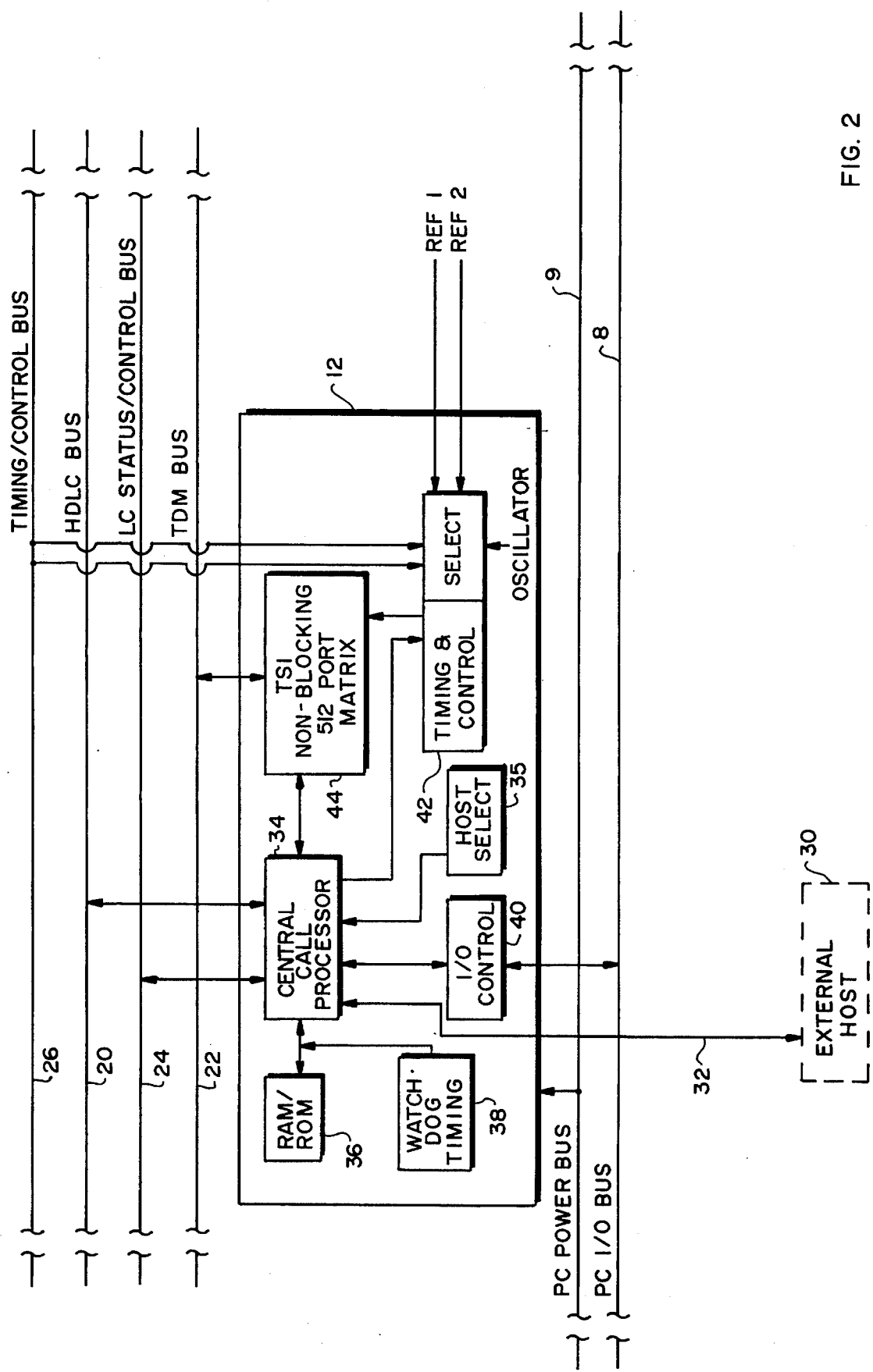
FIG. 2 is a detailed diagram of the CPU/matrix card of FIG. 1.

FIG. 2 shows the CPU/matrix card 12 in greater detail. A central call processor 34 is connected to both the HDLC bus 20 and the LC status/control bus 24. The central call processor 34 is also connected with host select circuitry 35, random access and read only memories 36, watchdog timing circuitry 38, input/output (I/O) control circuitry 40, timing and control/select circuitry 42 and a time slot interchange (TSI) 44. Timing and control/select circuitry 42 is connected to the TSI 44, the timing/control bus 26 (for loop timing) and to three sources of timing signals, which are denoted REF 1, REF 2 (which may be supplied by external sources for reference timing) and OSCILLATOR (which may be supplied by a free running oscillator located on the CPU/matrix card 12), respectively.

The central call processor 34, which is preferably a Motorola 68302 microprocessor, has control over all of the other circuitry on the CPU/matrix card 12. The central call processor 34 preferably runs under a real time operating system such as pSOS®, sold by Integrated Systems, and preferably uses Q.931-like messages, a CCITT standard protocol, for communicating over the HDLC bus 20. Using the HDLC bus 20, the central call processor 34 may transmit a message simultaneously to all cards connected to that bus. The processor 34 may use the LC status/control bus 24 to select a particular card to transmit a message over the HDLC bus 20.

The host select circuitry 35, which is preferably a switch, operates to inform the processor 34 whether to communicate with the internal hot or the external host upon power-up.

I/O control circuitry 40, which manages all communication between the central call processor 34 and the internal host, preferably appears as a COMM port or other standard PC I/O port on the PC I/O bus 8.

Timing and control/select circuitry 42, as described further below, operates in response to instructions from the central call processor 34 to select one of five available signals for synchronizing the CPU/matrix card 12. Two such signals are provided by the timing/control bus 26, the other three being REF 1, REF 2 and OSCILLATOR.

TSI 44, which is preferably a 512 port non-blocking matrix, receives incoming PCM voice data via the TDM bus 22 (time slots) and operates, as directed by the central call processor 34, to reorder the time slots and direct them over the bus 22 to the appropriate destinations.

Figure 3:
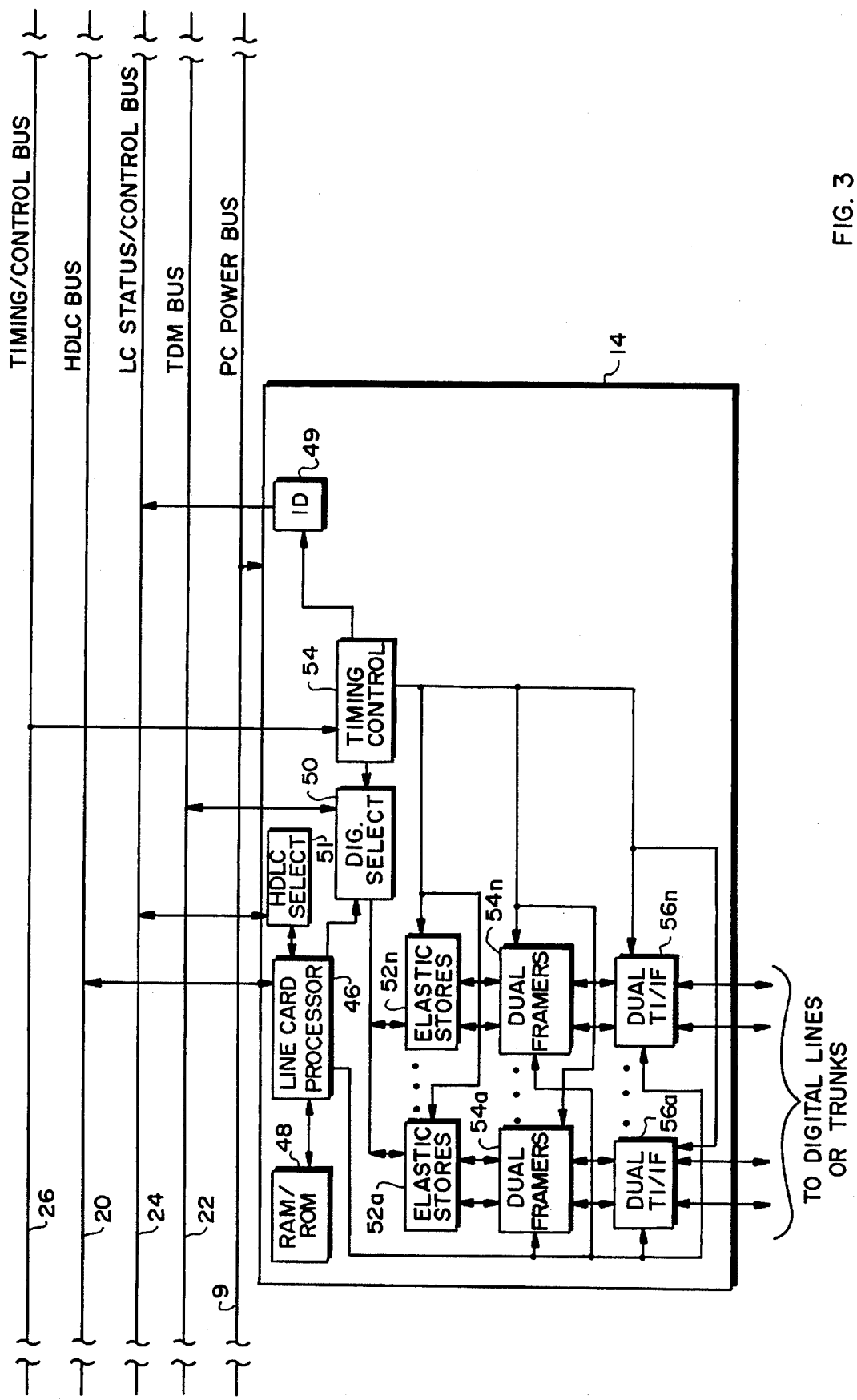
FIG. 3 is a detailed diagram of the digital line card of FIG. 1.

FIG. 3 shows the digital line card 14 of FIG. 1 in greater detail. The line card 14 includes a line card processor 46 which is connected with the HDLC bus 20, random access and read only memories 48, digital select circuitry 50, HDLC select circuitry 51, elastic stores 52a–52n, dual framers 54a–54n and dual T1 interfaces (IF) 56a–56n. Timing and control circuitry 54 is connected to the timing and control bus 26, identification (ID) circuitry 49, the digital select circuitry 50, the elastic stores 52a–52n, the dual framers 54a–54n and the dual T1 interfaces 56a–56n.

Line card processor 46, which is preferably a Motorola 68302 microprocessor, has control over the other circuitry on line card 14. Processor 46 communicates with the central call processor 34 on the CPU/matrix card 12 by exchanging messages over the HDLC bus 20. HDLC select circuitry 51, under the control of processor 46, is responsible for controlling the transmission of messages by the line card 14 over the HDLC bus 20.

Digital select circuitry 50 is responsible for moving PCM traffic between the TDM bus 22 and the elastic stores 52a–52n. On the digital line card 14, the PCM traffic represents only voice, tone or data and does not include any line signalling information.

Each dual T1 interface 56a–56n is capable of terminating two T1 spans, thus providing a maximum of 96 DS0 ports, out of the total of 512 ports available on the CPU/matrix card 12, per digital line card 14.

Figure 4:
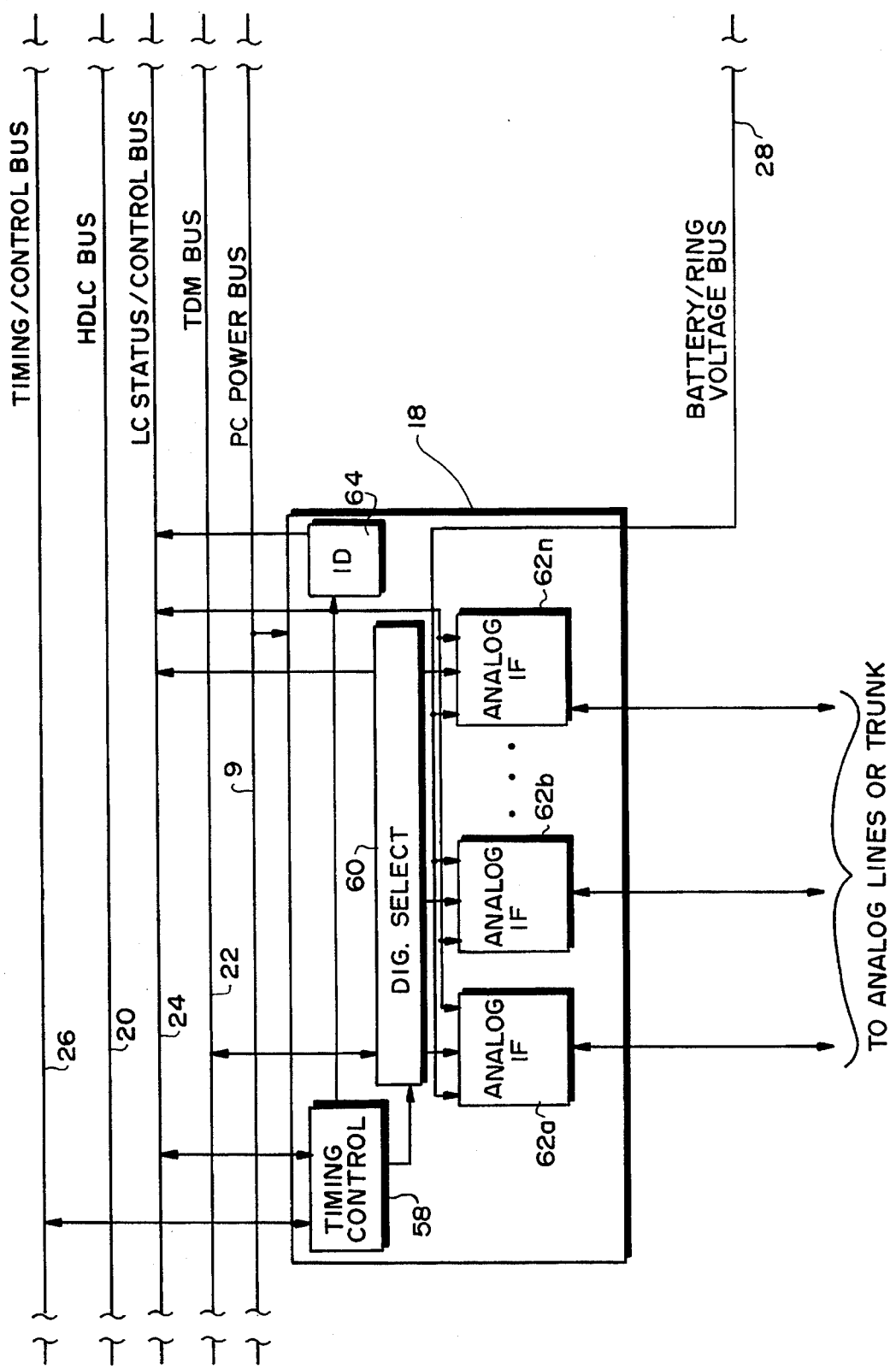
FIG. 4 is a detailed diagram of the analog line card of FIG. 1.

Turning now to FIG. 4, analog line card 18 includes timing and control circuitry 58, which is connected to the LC status/control bus 24, the timing/control bus 26, digital select circuitry 60 and identification (ID) circuitry 64, which is similar to ID circuitry 49 of FIG. 3. Digital select circuitry 60 is connected to analog interfaces 62a–62n. LC status/control bus 24 and battery/ring voltage bus 28 are connected to each analog interface 62a–62n.

Timing and control circuitry 58 communicates with the central call processor 34 on CPU/matrix card 12 via the LC status/control bus 24.

Digital select circuitry 60 is responsible for moving PCM traffic between the TDM bus 22 and the analog interfaces 62a–62n. In contrast with the digital line card 14, the PCM traffic between the analog line card 18 and the TDM bus may also contain line signalling information such as on-hook/off-hook, in addition to voice, tone signalling (in-band signalling) or data.

Analog interfaces 62a–62n are preferably separate physical modules which may be individually installed on the analog line card 18. Such separate modules may support different signalling protocols, thereby advantageously allowing different types of trunks to be terminated on a single analog line card 18.

With reference now to FIGS. 1–4, the operation of the programmable switch 10 will be described. When the switch 10 is initially powered up (i.e., the PC 2 is turned on), basic configuration information and operational system software must be downloaded from a host before initialization procedures or any call processing operations may commence. The CPU/matrix card 12 knows whether to request a download from the internal host or the external host based on the setting of the host select circuitry 35. After a successful download is completed, the selection of either the internal host or the external host may be made using messages between the host and switch 10.

Following a successful download of configuration information, all such information is preferably stored in random access memory 36 on the CPU/matrix card 12. The memory 36 is preferably provided with battery-backup in order to preserve the configuration information and eliminate the need for re-downloading in the future should the switch 10 experience a power loss.

The configuration information typically includes basic instructions as to how to control each type of port that the switch may have. Such instructions are stored in memory 36 on the CPU/matrix card 36 for all analog ports, but are downloaded and stored in memory 48 on the digital line card 14 for digital ports, as described below. Such information also preferably includes synchronization priority information which specifies an order in which the five possible synchronization signals available to the timing and control/select circuitry 42 should be used to synchronize the CPU/matrix card 12.

At this point, the central call processor 34 proceeds to interrogate all other cards present within the switch 10. The processor 34 uses the LC status/control bus 24 to interrogate all line cards, both digital and analog, and to receive responses from their respective ID circuitry. These responses indicate to the processor 34 what types and the number of line cards present.

Subsequently, the central call processor 34 will further interrogate the identified analog line cards 18, again using the LC status/control bus 24. In responding to this further interrogation, the analog interfaces 62a–62n identify the types of modules (signalling protocols) they represent, the number of modules, etc. This information is retained in the memory 36 on the CPU/matrix card 12.

Similarly, the central call processor 34 further interrogates identified digital line cards 14 using the HDLC bus 20. The processor 34 transmits a message via the HDLC bus 20 and the digital line card 14 responds with a message indicating the line card's status, how many ports are provided on the card and other information such as whether a download of basic instructions is needed. If a download is needed (requested by the line card 14), the central call processor 34 will respond by passing the appropriate information, previously received from the host, to the line card processor 46 via the HDLC bus 20.

Once all cards present have been identified and interrogated by the central call processor 34, that processor (using memory 36) constructs a map or table which includes the PCM address range, type of line card and status and type of each port within the switch 10. In addition, if a digital line card 14 is identified, the central call processor 34 will proceed to delegate appropriate call processing tasks to that line card's processor 46. In a preferred embodiment of the present invention, such delegated tasks include signalling supervision, call inpulsing and outpulsing, instruction control and management, detection of incoming calls and generation of outgoing calls.

At this point, the switch 10 is ready to begin normal operation in accordance with messages received by the CPU/matrix card 12 from the host and activity at the ports.

The foregoing description has been limited to a specific embodiment of this invention. It will be apparent, however, that variations and modifications may be made to the invention, with the attainment of some or all of the advantages of the invention. Therefore, it is the object of the appended claims to cover all such variations and modifications as come within the true spirit and scope of the invention.

What is claimed and desired to be secured by Letters Patent of the United States is:

1. A programmable communications switch system comprising:
   a personal computer including,
      a time slot interchange,
      a central call processor configured to perform real-time call control processing functions on said time slot interchange, and
      an internal host computer having a first application-oriented operating system to run communications applications that control said central call processor; and
   an external host computer having a second application-oriented operating system to run communications applications that control said central call processor;
   a host selector coupled to said central call processor, configured to select one of said internal and external host computers to control said central call processor,
   wherein said call control processor pertbrms all real-time call control processing in response to commands from said selected host computer,
   wherein said selected host computer controls said central call processor exclusively of said non-selected host computer.

2. A programmable communications switch system comprising:
   a personal computer including,
      a programmable communications switch, including, controllable-switching means for performing real-time call-control processing functions including dynamically connecting or disconnecting communication paths between various ones of a plurality of ports in re.sponse to predetermined messages, including,
         means for processing said predetermined messages,
         a time slot interchange, and
         a real time operating system;
      an internal host computer, having a first application-oriented operating system and being programmable to generate said predetermined messages to control said communications switch;
   an external host computer having a second application-oriented operating system and being programmable to generate said predetermined messages to control said communications switch;
   means for interfacing said switching means with said external host computer; and
   host select means, coupled to said message processing means, for selecting one of said internal or external host computers to control said controllable-switching means,
   wherein all real-time call control processing is managed by said switching means and wherein when said internal host computer is selected to control said communications switch, said internal host computer runs communications applications that control said switch exclusively of said external host computer and wherein when said external host is selected to control said communications switch, said external host computer controls runs communications applications that control said communications switch exclusive of said internal host computer.

3. The switch system as in claim 2 wherein said internal host computer comprises:
   a personal computer motherboard, including,
      an input/output bus, and
      a power bus,
   wherein said switching means is connected to both of said busses.

4. The switch system as in claim 3 wherein said programmable communications switch further comprises:
   one or more line cards, connected in communicating relationship with said switching means, for terminating either digital or analog lines or trunks.

5. The switch system as in claim 4 wherein each of said one or more line cards for terminating digital lines or trunks comprises;
   second means for processing messages generated by said switching means.

6. The switch system as in claim 5 wherein said message processing means of said switching means is operable to distinguish between said one or more line cards and may assign responsibility to said digital line card message processing means for performing one or more predetermined call processing tasks, while retaining responsibility for performing such tasks with respect to said analog line cards.

7. The switch system as in claim 2 further comprising:
   means, responsive to the message processing means, for selecting one of a plurality of synchronization signals available thereto.

8. A programmable communications switch system comprising:
   a personal computer including,
      a programmable communications switch, including,
         a central call processor configured to perform real-time call control processing related to communication paths established between various ones of a plurality of ports within said switch, said central call processor responsive to predetermined messages, including,
         a time slot interchange, and
         a real time operating system;
      a first host computer having a first application-oriented operating system to an communications applications that control said switch;
   a second host computer having a second application-oriented operating system to run communications applications that control said switch;
   means for interfacing said communications switch with the second host computer; and
   host selector, coupled to said central call processor, configured to select one of said first and second host computers to control said communications switch,
   wherein all real-time call control processing is managed by said central call processor and wherein when said first host computer is selected to control said communications switch said first host computer runs communications applications that control said switch exclusively of said second host computer and wherein when said second host is selected to control said communications switch, said second host computer runs communications applications that control said communications switch exclusive of said first host computer.

9. The system as in claim 8, wherein said first host computer further comprises:
   a personal computer motherboard which includes an input/output bus and a power bus and said communications switch is connected to both of said busses.

10. The system as in claim 9 further comprising;
one or more line cards, connected in communicating relationship with said central call processor, said one or more line cards being of a first type for terminating digital lines or trunks, or of a second type for terminating analog lines or trunks.

11. The system as in claim 10 wherein each of said one or more line cards for terminating digital lines or trunks comprises:
means for processing messages generated by said central call processor.

12. The system as in claim 11 wherein said central call processor is operable to distinguish between said one or more line cards and may assign responsibility to said digital line card message processing means for performing one or more predetermined real-time call processing tasks, while retaining responsibility for performing such tasks with respect to said analog line cards.

13. The system as in claim 8 wherein said switch further comprises:
timing selector, responsive to said central call processor, for selecting one of a plurality of synchronization signals available thereto.

14. The system as in claim 10 wherein said second host computer is connected with said interfacing means and exclusively controlling said central call processor without said first host computer.

15. The system as in claim 8, wherein said messages are generated by said first and second host computers in accordance with a predetermined format which is independent of the types of line cards that are included in said communications switch.

16. The system as in claim 10 wherein said analog line cards are connected in communicating relationship with said central call processor by a bus for carrying time division multiplex data, a timing/control bus and a line card status/control bus.

17. The system as in claim 10, wherein said switch further comprises a message processor for receiving and processing said predetermined messages, and further wherein each of said analog line cards includes means for responding to an interrogation by said message processor by identifying one or more types of signaling protocol modules located on said analog line card.

18. The system as in claim 10, wherein said switch further comprises a message processor for receiving and processing said predetermined messages, and further wherein each of said analog line cards includes means for responding to an interrogation by said message processor by indicating the number of signaling protocol modules located on said analog line card.

19. The system as in claim 10 wherein said digital line cards are connected in communicating relationship with said central call processor by a bus for carrying messages bidirectionally, a bus for carrying time division multiplex data, and a timing/control bus.

20. The system as in claim 10 wherein a second message processor of each of said digital line cards transmits one or more messages to said message processor of said central call processor which indicates the status of the digital line card.

21. The system as in claim 20 wherein said second message processor of each of said digital line cards transmits one or more messages to said message processor of said switch which indicates the types of ports provided by the digital line card.

22. The system as in claim 20 wherein said second message processor of each of said digital line cards transmits one or more messages to said message processor of said switch which indicates how many ports are provided on the digital line card.

23. The system as in claim 20 wherein said second message processor of each of said digital line cards transmits one or more messages to said message processor of said switch which indicates whether a download of instructions is needed by the digital line card.

24. The system as in claim 17 wherein said message processor of said central call processor, in response to receiving a message from a digital line card indicating that a download of instructions is needed, downloads instructions to said digital line card.

25. The system as in claim 17 wherein said message processor of said central call processor downloads instructions to said digital line card which include instructions for signalling supervision.

26. The system as in claim 17 wherein said message processor of said central call processor downloads instructions to said digital line card which include instructions for call inpulsing and outpulsing.

27. The system as in claim 17 wherein said message processor of said central call processor downloads instructions to said digital line card which include instructions for detection of incoming calls.

28. The system as in claim 17 wherein said message processor of said central call processor downloads instructions to said digital line card which include instructions for generation of outgoing calls.

* * * * *